US012055679B2

(12) United States Patent
Zhao et al.

(10) Patent No.: US 12,055,679 B2
(45) Date of Patent: Aug. 6, 2024

(54) OPTICAL IMAGING LENS ASSEMBLY

(71) Applicant: Zhejiang Sunny Optics Co., Ltd., Yuyao (CN)

(72) Inventors: Liefeng Zhao, Yuyao (CN); Lin Huang, Yuyao (CN); Fujian Dai, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 211 days.

(21) Appl. No.: 17/381,940

(22) Filed: Jul. 21, 2021

(65) Prior Publication Data
US 2022/0035126 A1 Feb. 3, 2022

(30) Foreign Application Priority Data
Jul. 29, 2020 (CN) .......................... 202010745835.5

(51) Int. Cl.
G02B 13/00 (2006.01)
G02B 9/04 (2006.01)

(52) U.S. Cl.
CPC ............. *G02B 13/003* (2013.01); *G02B 9/04* (2013.01)

(58) Field of Classification Search
CPC ...... G02B 9/04; G02B 13/003; G02B 15/146; G02B 15/16
See application file for complete search history.

*Primary Examiner* — Jack Dinh
(74) *Attorney, Agent, or Firm* — Reising Ethington P.C.

(57) ABSTRACT

An optical imaging lens assembly includes, sequentially from an object side to an image side along an optical axis, a first lens group having positive refractive power and including a first lens with refractive power; a second lens group, sequentially from the object side to the image side along the optical axis, including a second lens, a third lens, a fourth lens, a fifth lens and a sixth lens, each of which having refractive power; a plate glass; and a photosensitive element. At least one surface of at least one lens among the first to the sixth lenses is a non-rotationally symmetric surface. At least one of the first lens to the sixth lens is configured to be movable relative to the photosensitive element in the direction of the optical axis. A maximum optical distortion Distmax of the optical imaging lens assembly may satisfy: |Distmax|<5%.

12 Claims, 10 Drawing Sheets

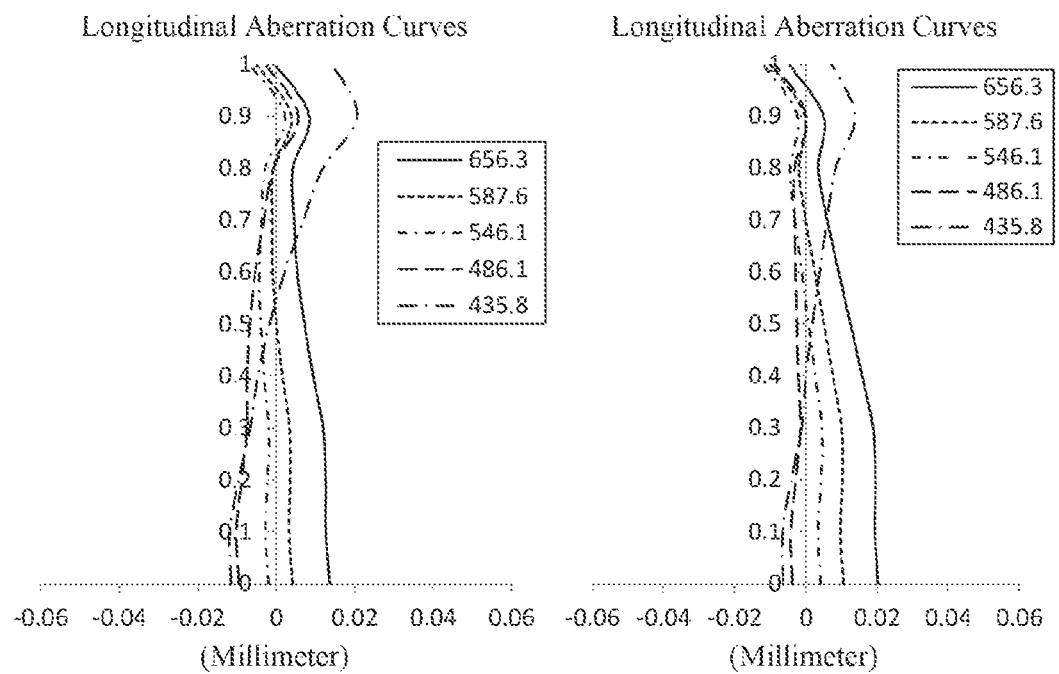
Fig. 2A
Fig. 2B
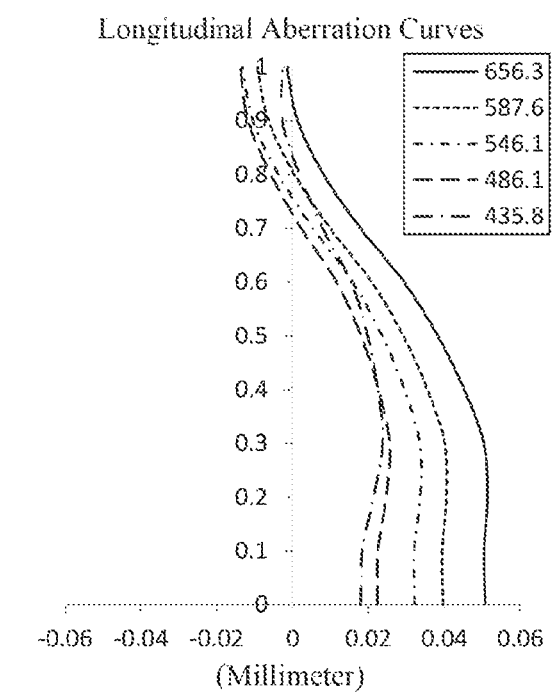
Fig. 2C

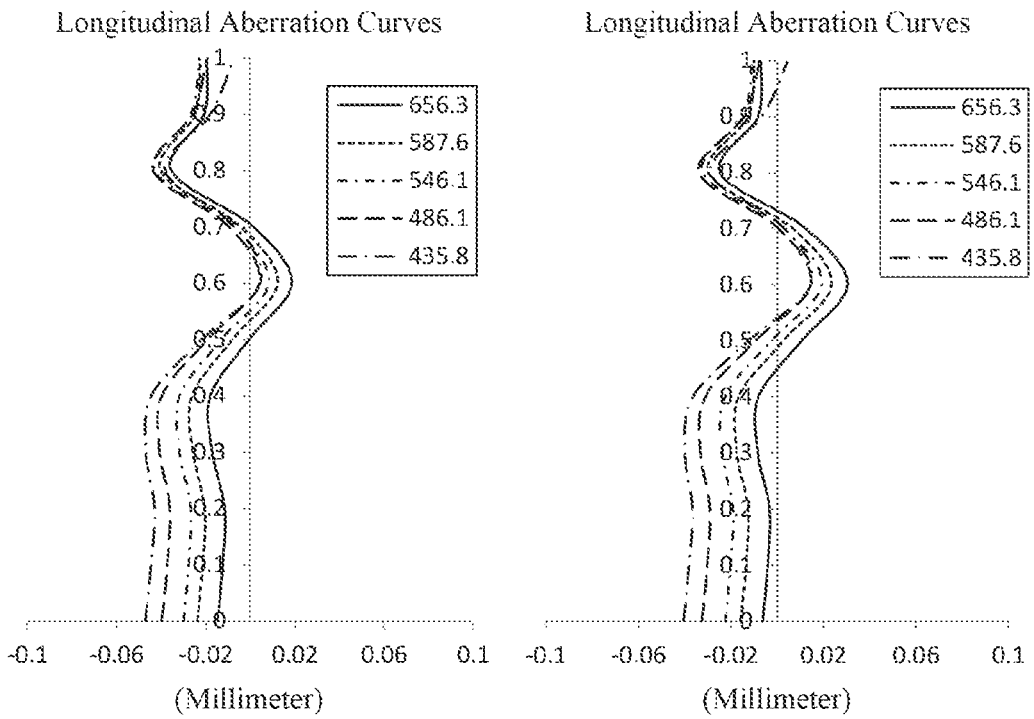
Fig. 7A
Fig. 7B
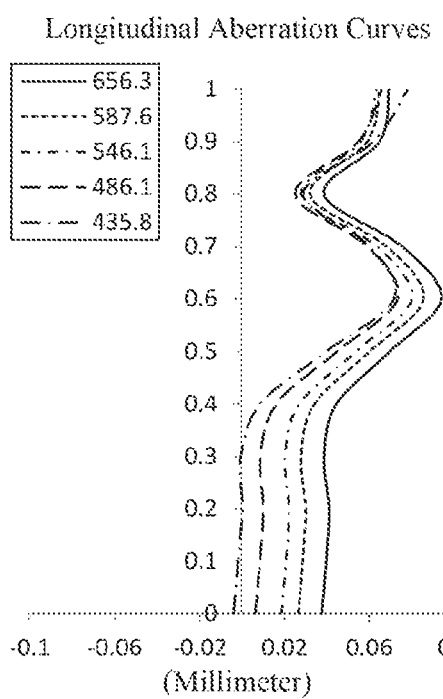
Fig. 7C

OPTICAL IMAGING LENS ASSEMBLY

CROSS-REFERENCE TO RELATED APPLICATION

This application claims benefit of priority to Chinese Patent Application No. 202010745835.5 filed on Jul. 29, 2020 before the China National Intellectual Property Administration, the entire disclosure of which is incorporated herein by reference in its entity.

TECHNICAL FIELD

The present disclosure relates to the field of optical elements, and more specifically, relates to an optical imaging lens assembly.

BACKGROUND

In recent years, with the upgrading of consumer electronic products and the development of image software functions and video software functions on consumer electronic products, the market demand for camera modules suitable for portable electronic products has gradually increased.

A camera module is usually provided on portable devices, such as mobile phones, so that the mobile phone has a camera function. The camera module includes an optical imaging lens assembly which is usually provided with an electronic photosensitive element and a lens group. The lens group may collect light from the object side. The light travels along an optical path of the lens group and irradiates on an electronic photosensitive element, and then the electronic photosensitive element converts the light signal into an electrical signal to form image data. It is generally desirable to control the size of the camera module to be able to adapt to the relatively small installation space of portable electronic devices.

However, users will use portable electronic products to take pictures in various scenarios. It is difficult for typical camera modules to maintain image quality in different shooting scenes or at different object distances.

In order to meet the requirements of miniaturization and imaging requirements, an optical imaging lens assembly that can simultaneously satisfy the characteristics of miniaturization, low optical distortion and adapt to different object distances is required.

SUMMARY

The present disclosure provides an optical imaging lens assembly which includes, sequentially from an object side to an image side along an optical axis, a first lens group having positive refractive power and including a first lens with refractive power; a second lens group, sequentially from the object side to the image side along the optical axis, including a second lens, a third lens, a fourth lens, a fifth lens and a sixth lens, each of which having refractive power; a plate glass; and a photosensitive element. At least one surface of at least one lens among the first to the sixth lenses is a non-rotationally symmetric surface. At least one of the first lens to the sixth lens is configured to be movable relative to the photosensitive element in the direction of the optical axis. A maximum optical distortion Distmax of the optical imaging lens assembly may satisfy: |Distmax|<5%.

In one embodiment, a maximum amount of change $\Delta CRAmax$ of a chief ray angle of the optical imaging lens assembly may satisfy: $\Delta CRAmax<2°$.

In one embodiment, an effective focal length fAy of one of the at least one lens in a Y-axis direction, and an effective focal length fAx of the one in an X-axis directions may satisfy: $0<10*|(fAy-fAx)/(fAy+fAx)|<10$.

In one embodiment, effective half-apertures of the second lens to the sixth lens increase sequentially. A maximum effective half-aperture DT51 of an object-side surface of the fifth lens, and a maximum effective half-aperture DT32 of an image-side surface of the third lens may satisfy: $1.5<DT51/DT32<2.5$.

In one embodiment, a maximum effective half-aperture DT41 of an object-side surface of the fourth lens, and a maximum effective half-aperture DT51 of an object-side surface of the fifth lens may satisfy: $0.5<DT41/DT51<1$.

In one embodiment, the optical imaging lens assembly further includes a stop disposed at an object side of the first lens. A distance ST from the stop to an object-side surface of the first lens along the optical axis, and a center thickness CT1 of the first lens along the optical axis may satisfy: $-1<ST/CT1<0$.

In one embodiment, the fifth lens has positive refractive power. A radius of curvature R9 of an object-side surface of the fifth lens, and an effective focal length f5 of the fifth lens may satisfy: $0.5<R9/f5<1.5$.

In one embodiment, a center thickness CT2 of the second lens along the optical axis, and a center thickness CT4 of the fourth lens along the optical axis may satisfy: $0.8<CT2/CT4<1.2$.

In one embodiment, a center thickness CT1 of the first lens along the optical axis, and a sum of center thicknesses $\Sigma CT$ along the optical axis of lenses in the first lens group and the second lens group may satisfy: $0.1<CT1/\Sigma CT<0.5$.

In one embodiment, an effective focal length f1 of the first lens, and an effective focal length f5 of the fifth lens may satisfy: $0.7<f1/f5<1.3$.

In one embodiment, an on-axis distance SAG52 from an intersection of an image-side surface of the fifth lens and the optical axis to a vertex of an effective radius of the image-side surface of the fifth lens, and a maximum effective half-aperture DT52 of the image-side surface of the fifth lens may satisfy: $-0.3<SAG52/DT52<0$.

In one embodiment, an Abbe number V3 of the third lens may satisfy: $30<V3<50$.

In one embodiment, a radius of curvature R1 of an object-side surface of the first lens, and a radius of curvature R4 of an image-side surface of the second lens may satisfy: $-0.5<(R1-R4)/(R1+R4)<0$.

In another aspect, the present disclosure further provides an optical imaging lens assembly which includes, sequentially from an object side to an image side along an optical axis, a first lens group having positive refractive power and including a first lens with refractive power; a second lens group, sequentially from the object side the image side along the optical axis, including a second lens, a third lens, a fourth lens, a fifth lens and a sixth lens, each of which having refractive power; a plate glass; and a photosensitive element. At least one surface of at least one lens among the first lens to the sixth lens is a non-rotationally symmetric surface. At least one of the first lens to the sixth lens is configured to be movable relative to the photosensitive element in the direction of the optical axis. An effective focal length fAy of one of the at least one lens in a Y-axis direction, and an effective focal length fAx of the one in an X-axis directions may satisfy: $0<10*|(fAy-fAx)/(fAy+fAx)|<10$.

In one embodiment, a maximum amount of change $\Delta CRAmax$ of a chief ray angle of the optical imaging lens assembly may satisfy: $\Delta CRAmax<2°$.

In one embodiment, effective half-apertures of the second lens to the sixth lens increase sequentially. A maximum effective half-aperture DT51 of an object-side surface of the fifth lens, and a maximum effective half-aperture DT32 of an image-side surface of the third lens may satisfy: $1.5<DT51/DT32<2.5$.

In one embodiment, a maximum effective half-aperture DT41 of an object-side surface of the fourth lens, and a maximum effective half-aperture DT51 of an object-side surface of the fifth lens may satisfy: $0.5<DT41/DT51<1$.

In one embodiment, the optical imaging lens assembly further includes a stop disposed at an object side of the first lens. A distance ST from the stop to an object-side surface of the first lens along the optical axis, and a center thickness CT1 of the first lens along the optical axis may satisfy: $-1<ST/CT1<0$.

In one embodiment, the fifth lens has positive refractive power. A radius of curvature R9 of an object-side surface of the fifth lens, and an effective focal length f5 of the fifth lens may satisfy: $0.5<R9/f5<1.5$.

In one embodiment, a center thickness CT2 of the second lens along the optical axis, and a center thickness CT4 of the fourth lens along the optical axis may satisfy: $0.8<CT2/CT4<1.2$.

In one embodiment, a maximum optical distortion Distmax of the optical imaging lens assembly may satisfy: $|Distmax|<5\%$.

In one embodiment, a center thickness CT1 of the first lens along the optical axis, and a sum of center thicknesses $\Sigma CT$ along the optical axis of lenses in the first lens group and the second lens group may satisfy: $0.1<CT1/\Sigma CT<0.5$.

In one embodiment, an effective focal length f1 of the first lens, and an effective focal length f5 of the fifth lens may satisfy: $0.7<f1/f5<1.3$.

In one embodiment, an on-axis distance SAG52 from an intersection of an image-side surface of the fifth lens and the optical axis to a vertex of an effective radius of the image-side surface of the fifth lens, and a maximum effective half-aperture DT52 of the image-side surface of the fifth lens may satisfy: $-0.3<SAG52/DT52<0$.

In one embodiment, an Abbe number V3 of the third lens may satisfy: $30<V3<50$.

In one embodiment, a radius of curvature R1 of an object-side surface of the first lens, and a radius of curvature R4 of an image-side surface of the second lens may satisfy: $-0.5<(R1-R4)/(R1+R4)<0$.

The present disclosure employs two sets of lenses, specifically six lenses may be used in total, and at least one of the at least one lens in the second lens group, the plate glass, or the photosensitive element is configured to be movable along the optical axis. Therefore, the lens assembly may be focused by moving and fine-tuning the movable optical components. The present disclosure may automatically zoom for subjects at different positions. Further, on the basis of having a non-rotationally symmetrical surface, the above optical imaging lens assembly has a compact overall structure and at least one beneficial effect such as clear imaging, high resolution, and small optical distortion by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 2A to 2C illustrate longitudinal aberration curves of the optical imaging lens assembly in FIGS. 1A to 1C, respectively.

FIGS. 7A to 7C illustrate longitudinal aberration curves of the optical imaging lens assembly in FIGS. 6A to 6C, respectively.

DETAILED DESCRIPTION OF EMBODIMENTS

Figure 1A:
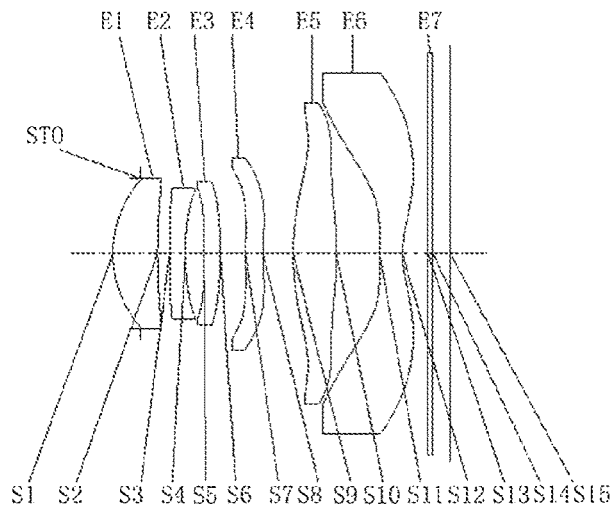
FIGS. 1A to 1C illustrate schematic structural views of an optical imaging lens assembly according to example 1 of the present disclosure in states where the object distance is infinite, the object distance is 500 mm, and the object distance is 100 mm.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region.

In each lens, the surface closest to the object is referred to as an object-side surface of the lens, and the surface closest to the imaging plane is referred to as an image-side surface of the lens.

Herein, we define the direction parallel to the optical axis as a Z-axis direction, define the direction perpendicular to the Z-axis and in the tangential plane as a Y-axis direction, and define the direction perpendicular to the Z-axis and in the sagittal plane as an X-axis direction. Unless otherwise specified, in the examples related to free-form surfaces herein, parameter symbols (for example, the radius of curvature, etc.) other than the parameter symbol related to the field of view represent the characteristic parameter value along the Y-axis direction of the camera lens group. For example, unless otherwise specified, fx represents the focal length of the optical imaging system in the X-axis direction, and fy represents the focal length of the optical imaging system in the Y-axis direction.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include a first lens group, a second lens group, a plate glass, and a photosensitive element. The optical components are arranged sequentially from an object side to an image side along an optical axis.

When the optical imaging lens assembly is installed in other equipment, the photosensitive element is usually connected to a circuit board and so on and is fixed, and the plate glass is usually fixed relative to the photosensitive element. As an example, the first lens group may be fixed.

In an exemplary embodiment, the first lens group has positive refractive power and includes a first lens. As an example, the first lens may have positive refractive power. When the first lens group includes a plurality of lenses, the first lens is the lens closest to the object side.

In an exemplary embodiment, the second lens group may include, for example, five lenses having refractive power, that is, a second lens, a third lens, a fourth lens, a fifth lens, and a sixth lens. The five lenses are arranged sequentially from an object side to an image side along an optical axis. In the lenses of the optical imaging lens assembly, there may be an air interval between each two adjacent lenses.

In an exemplary embodiment, the second lens has positive or negative refractive power; the third lens has positive or negative refractive power; the fourth lens has positive or negative refractive power; the fifth lens has positive or negative refractive power; and the sixth lens has positive or negative refractive power.

In an exemplary embodiment, an object-side surface of the first lens may be convex, and an image-side surface of the second lens may be concave.

In an exemplary embodiment, the object-side surface or the image-side surface of at least one of the first lens to the sixth lens is a non-rotationally symmetric surface. Specifically, a non-rotationally symmetrical surface is a non-rotationally symmetrical aspheric surface, that is, a non-rotationally symmetrical component is added to the rotationally symmetrical aspherical surface. The non-rotationally symmetrical aspheric mirror surface is beneficial to reduce optical distortion and TV distortion, and is beneficial to correct the off-axis tangential aberration and sagittal aberration of the optical imaging system, thereby improving the image quality of the optical imaging system and making the structure of the optical imaging lens assembly more compact.

In an exemplary embodiment, the above optical imaging lens assembly may further include at least one stop. The stop may be disposed at an appropriate position as required, for example, between the object side and the first lens group. As an example, the first lens in the first lens group is the lens closest to the object side, and the stop is disposed between the object side and the first lens. Optionally, the above optical imaging lens assembly may further include an optical filter for correcting the color deviation.

Plate glass may be used to protect the photosensitive element. The photosensitive element is used for imaging, and it may be an electronic photosensitive element. The electronic photosensitive element may be a Charge-Coupled Device (CCD) or a Complementary Metal-Oxide Semiconductor (CMOS). The plane where the effective pixel area of the photosensitive element is located regards as an actual imaging plane of the optical imaging lens assembly.

In an exemplary embodiment, at least one of the second lens to the sixth lens, the plate glass, and the photosensitive element is movable relative to the first lens in the optical axis direction. The movement may have a continuous stroke and stay at any position in the stroke, or it may stay in several preset positions. As an example, at least one lens arranged in this movement may stay at three different positions, so that the optical imaging lens assembly has a state where the object distance is infinite, a state where the object distance is 500 mm, and a state where the object distance is 100 mm. As an example, a plurality of movable lenses are fixedly connected to each other, and the plurality of lenses move synchronously. As an example, the movable lens moves independently from the other lens. Specifically, the movable optical element may slide along the optical axis, or may move in other ways. The movable lens has a plurality of relatively fixed positions on the optical axis. By moving the lens, the optical imaging lens assembly provided by the present disclosure may achieve the auto-focusing function, and at the same time, the refractive power and the surface shape of each lens cooperates with each other to make the overall structure more compact.

In an exemplary embodiment, the optical imaging lens assembly according to the present disclosure may satisfy: |Distmax|<5%, where Distmax is a maximum optical distortion of the optical imaging lens assembly. When the absolute value of Distmax is less than 5%, it may ensure that the optical imaging lens assembly has small optical distortion in each state during the focusing process, and it may ensure that the image distortion of the optical imaging lens assembly is small during the focusing process, thereby improving the image quality. More specifically, Distmax may further satisfy: |Distmax|<4.85%. For example, Distmax=1.5%.

In an exemplary embodiment, the optical imaging lens assembly according to the present disclosure may satisfy: ΔCRAmax<2°, where ΔCRAmax is a maximum amount of change of a chief ray angle (CRA) of the optical imaging lens assembly. During the zooming process of the optical imaging lens assembly, the optical path structure of the optical imaging lens assembly will change. When the optical imaging lens assembly is in states with different object distances, the same incident light may have different optical paths in the optical imaging lens assembly, and the CRA when the main ray illuminates the photosensitive element will also be different. Based on the zoom of the optical imaging lens assembly, the amount of change of CRA includes a maximum amount of change ΔCRAmax. Satisfying ΔCRAmax<2° may ensure that the chief ray angle of the optical imaging lens assembly changes little during the focusing process, and the lens and the electronic photosensitive element may be better matched. More specifically, ΔCRAmax may satisfy: ΔCRAmax<1.7°. For example, ΔCRAmax=1.0°.

In an exemplary embodiment, the optical imaging lens assembly according to the present disclosure may satisfy: 0<10*|(fAy−fAx)/(fAy+fAx)|<10, where fAy is an effective focal length of any one of the lenses with a non-rotationally symmetric surface in a Y-axis direction, and fAx is an effective focal length of the one lens in an X-axis directions. When 0<10*|(fAy−fAx)/(fAy+fAx)|<10 is satisfied, the non-rotationally symmetrical surface may be reasonably configured to more effectively correct the deformation of the image, thereby improving the image quality of the optical imaging lens assembly. For example, the value of 10*|(fAy−fAx)/(fAy+fAx)| is 9.5, 8.2, 5.5, or 2.4. More specifically, fAy and fAx may further satisfy: 0<10*|(fAy−fAx)/(fAy+fAx)|<1. For example, the value of 10*|(fAy−fAx)/(fAy+fAx)| is 0.9, 0.6, or 0.1.

In an exemplary embodiment, the optical imaging lens assembly according to the present disclosure may satisfy: 1.5<DT51/DT32<2.5, where DT51 is a maximum effective half-aperture of an object-side surface of the fifth lens, and DT32 is a maximum effective half-aperture of an image-side surface of the third lens. When 1.5<DT51/DT32<2.5 is satisfied, the effective half-aperture of the fifth lens and the effective half-aperture of the third lens may be reasonably distributed, and the size of the optical imaging lens assembly in the radial direction of the optical axis may be controlled, which is conducive to achieve a compact structure. More specifically, DT51 and DT32 may satisfy: 1.90<DT51/DT32<2.00.

In an exemplary embodiment, effective half-apertures of the second lens to the sixth lens increase sequentially.

In an exemplary embodiment, the optical imaging lens assembly according to the present disclosure may satisfy: 0.5<DT41/DT51<1, where DT41 is a maximum effective half-aperture of an object-side surface of the fourth lens, and DT51 is a maximum effective half-aperture of an object-side surface of the fifth lens. When 0.5<DT41/DT51<1 is satisfied, the effective half-aperture of the fourth lens and the effective half-aperture of the fifth lens may be reasonably distributed, and the size of the optical imaging lens assembly in the radial direction of the optical axis may be controlled, which is conducive to achieve a compact structure and the miniaturization of the optical imaging lens assembly. More specifically, DT41 and DT51 may satisfy: 0.55<DT41/DT51<0.70.

In an exemplary embodiment, when a stop is disposed at an object side of the first lens, the optical imaging lens assembly according to the present disclosure may satisfy: −1<ST/CT1<0, where ST is a distance from the stop to an object-side surface of the first lens along the optical axis, and CT1 is a center thickness of the first lens along the optical axis. Satisfying −1<ST/CT1<0 is conducive to reasonably setting the position of the stop and may effectively improve the resolution of the optical imaging lens assembly. More specifically, ST and CT1 may satisfy: −0.65<ST/CT1<−0.55.

In an exemplary embodiment, the optical imaging lens assembly according to the present disclosure may satisfy: 0.5<R9/f5<1.5, where R9 is a radius of curvature of an object-side surface of the fifth lens, and f5 is an effective focal length of the fifth lens. If 0.5<R9/f5<1.5 is satisfied, the lens shape of the fifth lens may be set reasonably, so as to achieve the reduction of the chief ray angle. For example, the value of R9/f5 is 0.6, 0.9, or 1.4. More specifically, R9 and f5 may satisfy: 0.85<R9/f5<1.10.

In an exemplary embodiment, the optical imaging lens assembly according to the present disclosure may satisfy: 0.8<CT2/CT4<1.2, where CT2 is a center thickness of the second lens along the optical axis, and CT4 is a center thickness of the fourth lens along the optical axis. When 0.8<CT2/CT4<1.2 is satisfied, the center thicknesses of the second lens and the fourth lens may be reasonably distributed, which is beneficial to compress the structure of the optical imaging lens assembly and improve the resolution thereof. More specifically, CT2 and CT4 may satisfy: 0.85<CT2/CT4<1.05.

In an exemplary embodiment, the optical imaging lens assembly according to the present disclosure may satisfy: 0.1<CT1/ΣCT<0.5, where CT1 is a center thickness of the first lens along the optical axis, and ΣCT is a sum of center thicknesses along the optical axis of the lenses in the first lens group and the second lens group. As an example, ΣCT is the sum of the center thicknesses along the optical axis of the first lens to the sixth lens, i.e. ΣCT=CT1+CT2+CT3+CT4+CT5+CT6. The definitions of CT2 to CT6 refers to CT1. Satisfying 0.1<CT1/ΣCT<0.5 may effectively control the total optical length of the optical imaging lens assembly, so that the optical imaging lens assembly may be miniaturized. More specifically, CT1 and ΣCT may satisfy: 0.17<CT1/ΣCT<0.30.

In an exemplary embodiment, the optical imaging lens assembly according to the present disclosure may satisfy: 0.7<f1/f5<1.3, where f1 is an effective focal length of the first lens, and f5 is an effective focal length of the fifth lens. By controlling the ratio of the effective focal lengths of the first lens and the fifth lens within this range, the resolution and imaging quality of the optical imaging lens assembly may be effectively improved. More specifically, f1 and f5 may satisfy: 0.90<f1/f5<1.10.

In an exemplary embodiment, the optical imaging lens assembly according to the present disclosure may satisfy: −0.3<SAG52/DT52<0, where SAG52 is an on-axis distance from an intersection of an image-side surface of the fifth lens and the optical axis to a vertex of an effective radius of the image-side surface of the fifth lens, and DT52 is a maximum effective half-aperture of the image-side surface of the fifth lens. Satisfying −0.3<SAG52/DT52<0 may make the fifth lens have a reasonable lens shape, thereby compressing the size of the optical imaging lens assembly. More specifically, SAG52 and DT52 may satisfy: −0.20<SAG52/DT52<−0.10.

In an exemplary embodiment, the optical imaging lens assembly according to the present disclosure may satisfy: 30<V3<50, where V3 is an Abbe number of the third lens. Reasonably select the material of the third lens so that the Abbe number of the third lens satisfies 30<V3<50, which may effectively reduce the chromatic aberration of the optical imaging lens assembly and improve the resolution and image quality of the optical imaging lens assembly. For example, the value of V3 is 32, 38.01, or 45.60. More specifically, V3 may satisfy: 37<V3<40.

In an exemplary embodiment, the optical imaging lens assembly according to the present disclosure may satisfy: −0.5<(R1−R4)/(R1+R4)<0, where R1 is a radius of curvature of an object-side surface of the first lens, and R4 is a radius of curvature of an image-side surface of the second lens. Satisfying −0.5<(R1−R4)/(R1+R4)<0 may make the lens have a reasonable shape and structure, so that the optical imaging lens assembly has a high resolution. More specifically, R1 and R4 may satisfy: −0.42<(R1−R4)/(R1+R4)<−0.30. As an example, in this example, the object-side surface of the first lens is convex, and the image-side surface of the second lens is concave.

The optical imaging lens assembly according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the optical imaging lens assembly may be effectively reduced, and the workability of the optical imaging lens assembly may be improved, such that the optical imaging lens assembly is more advantageous for production processing and may be applied to portable electronic products. At the same time, the optical imaging lens assembly of the present disclosure also has excellent optical performance such as clear imaging, high resolution, and small optical distortion. When the optical imaging lens assembly is used to photograph subjects at different positions, it may achieve focusing by fine-tuning some optical elements, and the imaging quality is good.

In the embodiments of the present disclosure, the surface of each lens may further include an aspheric surface, that is, at least one of the object-side surface of the first lens to the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens and the sixth lens is aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking six lenses as an example, the optical imaging lens assembly is not limited to include six lenses. The optical imaging lens assembly may also include other numbers of lenses if desired.

Some specific examples of an optical imaging lens assembly applicable to the above embodiment will be further described below with reference to the accompanying drawings.

Example 1

Figure 1B:
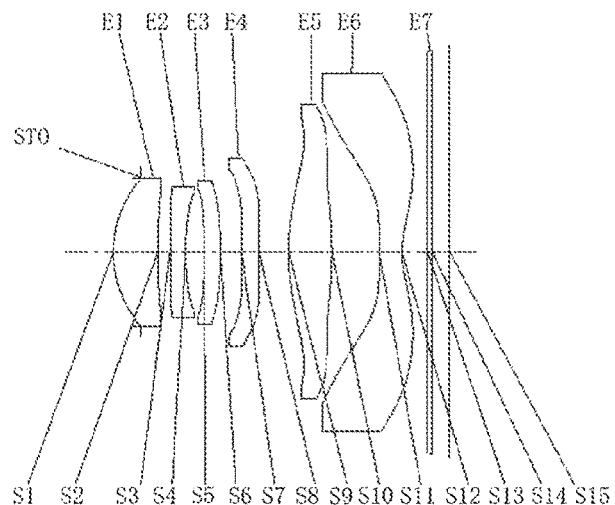
Figure 1C:
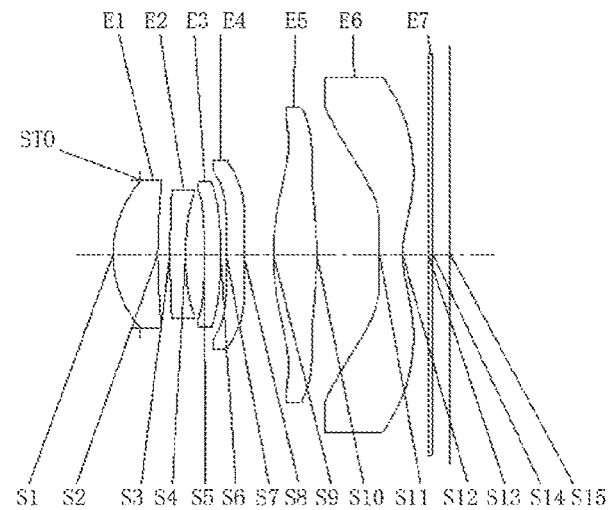

An optical imaging lens assembly according to example 1 of the present disclosure is described below with reference to FIG. 1A to FIG. 5C. FIGS. 1A to 1C show schematic structural views of the optical imaging lens assembly according to example 1 of the present disclosure.

As shown in FIG. 1A to FIG. 1C, the optical imaging lens assembly includes a stop STO, a first lens E1, a second lens E2, a third lens E3, a fourth lens E4, a fifth lens E5, a sixth lens E6, a plate glass E7 and an electronic photosensitive element (not shown), which are sequentially arranged from an object side to an image side along an optical axis. The first lens E1 forms the first lens group, and the second lens E2 to the sixth lens E6 form the second lens group. In this example, the fourth lens E4 and the fifth lens E5 are configured to be movable along the optical axis. An optical filter may be disposed at an image side of the sixth lens E6.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is concave, and an image-side surface S6 thereof is convex. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave.

The plate glass E7 has an object-side surface S13 and an image-side surface S14. Light from an object sequentially passes through the respective surfaces S1 to S14 and is finally imaged on the electronic photosensitive element. Specifically, the plane where an effective pixel area of the electronic photosensitive element is located serves as an actual imaging plane S15 of the optical imaging lens assembly.

Table 1 is a table illustrating basic parameters of the optical imaging lens assembly of example 1, wherein the units for the radius of curvature Y, the radius of curvature X, the thickness/distance and the focal length are millimeter (mm). Here, OD represents the object distance, T1 represents the spaced interval between the first lens E1 and the second lens E2 along the optical axis, T2, T3, T4, and T5 have similar definitions as T1, and T6 represents the spaced interval between the sixth lens E6 and the plate glass E7 along the optical axis. The value of the effective focal length f6 of the sixth lens E6 is equal to the value of the effective focal length fAy thereof in the Y-axis direction.

TABLE 1

| Surface number | Surface type | Radius of curvature Y | Radius of curvature X | Thickness | Material Refractive index | Abbe number | Focal length | Conic coefficient Y | Conic coefficient X |
|---|---|---|---|---|---|---|---|---|---|
| OBJ | Spherical | Infinite | | OD | | | | | |
| STO | Spherical | Infinite | | −0.6347 | | | | | |
| S1 | Aspheric | 2.5980 | | 1.0222 | 1.55 | 56.1 | 5.79 | 0.0183 | |
| S2 | Aspheric | 12.4877 | | T1 | | | | 23.6457 | |
| S3 | Aspheric | 21.4399 | | 0.3602 | 1.68 | 19.2 | −11.97 | −99.0000 | |
| S4 | Aspheric | 5.8551 | | T2 | | | | 1.8051 | |
| S5 | Aspheric | −34.6064 | | 0.3758 | 1.57 | 37.3 | 42.57 | 50.0000 | |
| S6 | Aspheric | −14.3382 | | T3 | | | | −26.2834 | |
| S7 | Aspheric | 14.6439 | | 0.4010 | 1.62 | 25.9 | −30.26 | −23.2750 | |
| S8 | Aspheric | 8.1422 | | T4 | | | | −4.4195 | |
| S9 | Aspheric | 5.4839 | | 0.9955 | 1.55 | 56.1 | 6.17 | 0.3763 | |
| S10 | Aspheric | −8.2061 | | T5 | | | | 3.3684 | |
| S11 | Aspheric | 14.0268 | | 0.5258 | 1.54 | 55.7 | −4.98 | −77.5502 | |
| S12 (AAS) | Aspheric | 2.2163 | 2.1968 | T6 | | | | −0.9662 | −0.9451 |
| S13 | Spherical | Infinite | | 0.1100 | 1.52 | 64.2 | | | |
| S14 | Spherical | Infinite | | 0.4000 | | | | | |
| S15 | Spherical | Infinite | | | | | | | |

Table 2 is a table illustrating relevant parameters of the optical imaging lens assembly when the object distance is infinite, 500 mm, and 100 mm, wherein the units for the TTL, $f$ and ImgH are all millimeter (mm), and "←" means the same value as the left side.

TABLE 2

| OD | Infinite | 500.0000 | 100.0000 |
|---|---|---|---|
| T1 | 0.2814 | ← | ← |
| T2 | 0.4227 | ← | ← |
| T3 | 0.5845 | 0.4879 | 0.1327 |
| T4 | 0.6873 | ← | ← |
| T5 | 0.9911 | 1.0877 | 1.4429 |
| T6 | 0.5929 | ← | ← |
| TTL | 7.75 | ← | ← |
| FOV (°) | 71.7 | 72.2 | 73.9 |
| Fno | 1.88 | 1.89 | 1.92 |
| f | 6.46 | 6.32 | 5.85 |
| ImgH | 4.79 | ← | ← |

According to Table 2, in Example 1, compared with the optical imaging lens in a state where the object distance is infinite, when the optical imaging lens assembly is in a state where the object distance is 100 mm, the fourth lens E4 and the fifth lens E5 are closer to the first lens E1 on the optical axis. An on-axis distance TTL from the object-side surface of the first lens E1 to the imaging plane S15 is always 7.75 mm, and half of a diagonal length ImgH of an effective pixel area on the imaging plane S15 is always 4.79 mm. A maximum field-of-view FOV and an aperture number Fno change with the movement of the movable optical element, and at the same time, a total effective focal length $f$ of the optical imaging lens assembly is constantly adjusted. The total effective focal length $f$ corresponds to the state of the object distance.

In example 1, the object-side surface and the image-side surface of any one of the first lens E1 to the fifth lens E5, and the object-side surface S11 of the sixth lens E6 are aspheric. The surface shape of each aspheric lens may be defined by using, but not limited to, the following aspheric formula:

$$z = \frac{ch^2}{1 + \sqrt{1 - (k+1)c^2 h^2}} + \sum A_i h^i \quad (1)$$

Where, z is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 3 below shows high-order coefficients A4, A6, A8, A10, A12, A14, A16, A18, A20, A22, A24, A26, A28 and A30 applicable to each aspheric surface S1 to S12 in example 1.

TABLE 3

| Surface number | A4 | A6 | A8 | A10 | A12 | A14 | A16 |
|---|---|---|---|---|---|---|---|
| S1 | 3.4005E−03 | −1.8207E−03 | −1.3477E−03 | −5.3314E−04 | −1.9666E−04 | −2.9881E−05 | 4.8589E−06 |
| S2 | −3.2869E−02 | 1.4520E−03 | −5.6466E−04 | −7.4665E−05 | −2.0805E−05 | −3.7961E−06 | −4.6778E−06 |
| S3 | 1.4115E−03 | 1.5088E−02 | −3.8940E−03 | −6.7750E−04 | −3.0977E−04 | −1.8138E−04 | −7.5723E−05 |
| S4 | 4.1107E−02 | 2.0400E−02 | 5.0888E−04 | 3.8226E−05 | −2.6280E−04 | −3.0083E−04 | −1.7758E−04 |
| S5 | −1.8674E−01 | −1.8081E−03 | 4.9900E−03 | −3.5374E−04 | −1.4758E−03 | −6.6211E−04 | 2.0064E−04 |
| S6 | −2.4608E−01 | −8.8240E−03 | 5.5723E−03 | 1.2130E−03 | −9.0886E−04 | −6.4379E−04 | −6.1023E−04 |
| S7 | −6.0963E−01 | 1.1021E−02 | −2.1252E−02 | −3.8475E−03 | −5.2107E−03 | −8.9014E−04 | 2.0114E−04 |
| S8 | −1.0118E+00 | 1.2475E−01 | −1.1242E−02 | −2.1296E−04 | −6.5768E−03 | 8.4908E−04 | 1.3194E−03 |
| S9 | −1.0744E+00 | −2.2910E−02 | 3.3308E−02 | 7.9474E−03 | −1.1161E−02 | −1.8561E−03 | −1.5693E−04 |
| S10 | 8.3961E−01 | −2.3373E−01 | 4.4909E−02 | 1.9637E−02 | −1.1817E−02 | −1.9700E−03 | 1.0855E−03 |
| S11 | −2.0711E+00 | 6.9574E−01 | −2.2660E−01 | 6.1221E−02 | −1.2096E−02 | 1.3848E−03 | 5.0534E−04 |

TABLE 3-continued

| Surface number | A18 | A20 | A22 | A24 | A26 | A28 | A30 |
|---|---|---|---|---|---|---|---|
| S1 | 8.5214E−06 | −6.5626E−06 | −1.0750E−05 | −1.3576E−05 | −1.6128E−05 | −1.3951E−05 | −6.7418E−06 |
| S2 | −1.2076E−06 | −3.1135E−07 | −3.1369E−08 | −1.9921E−08 | 1.0116E−07 | 3.9167E−08 | −3.9769E−09 |
| S3 | −8.4035E−05 | −3.9588E−05 | −2.7201E−05 | 1.5203E−06 | 1.7659E−06 | 5.1139E−06 | −3.8113E−06 |
| S4 | −1.4011E−04 | −8.6905E−05 | −7.8919E−05 | −5.8879E−05 | −5.0352E−05 | −2.8359E−05 | −1.2459E−05 |
| S5 | 4.0393E−04 | 2.1560E−04 | −1.8106E−05 | −8.3242E−05 | −5.1319E−05 | −9.0207E−06 | 2.0941E−06 |
| S6 | −3.7285E−04 | −1.1057E−04 | 1.4978E−04 | 2.6292E−04 | 2.1271E−04 | 1.0159E−04 | 2.1505E−05 |
| S7 | 8.2892E−04 | 6.7293E−04 | 4.7368E−04 | 2.5792E−04 | 1.3071E−04 | 3.4899E−05 | 7.8109E−06 |
| S8 | 1.1749E−03 | 3.7641E−04 | 9.6867E−05 | 9.0995E−06 | 2.1737E−05 | 2.0085E−06 | 5.5080E−06 |
| S9 | −1.7552E−03 | −8.5033E−04 | −4.0291E−04 | 2.4716E−05 | −6.8987E−05 | −2.5428E−05 | −3.9491E−05 |
| S10 | −1.6620E−03 | 8.4504E−04 | 8.9061E−04 | 8.7954E−04 | 6.4494E−04 | 3.5067E−04 | 8.9472E−05 |
| S11 | −5.6320E−04 | 5.7573E−05 | −9.3123E−05 | 1.2905E−04 | −1.7008E−05 | −7.7000E−05 | 5.6584E−05 |

It can also be seen from Table 1 that the image-side surface S12 of the sixth lens E6 is a non-rotationally symmetrical aspheric surface (i.e., a free-form surface or AAS surface). The surface shape of the non-rotationally symmetrical aspheric surface may be defined by using, but not limited to, the following non-rotationally symmetrical aspheric surface formula:

$$z_{12} = \frac{(CUX)x^2 + (CUY)y^2}{1 + \sqrt{1 - (1+KX)(CUX)^2 x^2 - (1+KY)(CUY)^2 y^2}} +$$
$$AR\{(1-AP)x^2 + (1+AP)y^2\}^2 + BR\{(1-BP)x^2 + (1+BP)y^2\}^3 +$$
$$CR\{(1-CP)x^2 + (1+CP)y^2\}^4 +$$
$$DR\{(1-DP)x^2 + (1+DP)y^2\}^5 +$$
$$ER\{(1-EP)x^2 + (1+EP)y^2\}^6 + FR\{(1-FP)x^2 + (1+FP)y^2\}^7 +$$
$$GR\{(1-GP)x^2 + (1+GP)y^2\}^8 +$$
$$HR\{(1-HP)x^2 + (1+HP)y^2\}^9 + JR\{(1-JP)x^2 + (1+JP)y^2\}^{10}$$

(2)

Where, $z_{12}$ is a vector height of the surface in a direction parallel to the Z axis; CUX and CUY are the curvature of the vertex of the surface in the X and Y axis directions (curvature is the reciprocal of the radius of curvature), respectively; KX, KY are the conic coefficients in the X and Y axis directions, respectively; AR, BR, CR, DR, ER, FR, GR, HR and JR are the 4th, 6th, 8th, 10th, 12th, 14th, 16th, 18th and 20th order coefficients of the rotationally symmetric component of the aspheric surface, respectively; AP, BP, CP, DP, EP, FP, GP, HP and JP are the 4th, 6th, 8th, 10th, 12th, 14th, 16th, 18th and 20th order coefficients of the non-rotationally symmetric component of the aspheric surface, respectively. Table 4 below shows the high-order coefficients of the rotationally symmetric component and the non-rotationally symmetric component applicable to the non-rotationally symmetric aspheric surface S12 in example 1.

TABLE 4

| AAS SURFACE | AR | BR | CR | DR | ER |
|---|---|---|---|---|---|
| S12 | −8.9400E−02 | 2.3150E−02 | −4.5649E−03 | 6.4176E−04 | −6.1949E−05 |

| AAS SURFACE | FR | GR | HR | JR |
|---|---|---|---|---|
| S12 | 3.9497E−06 | −1.5769E−07 | 3.5579E−09 | −3.4536E−11 |

| AAS SURFACE | AP | BP | CP | DP | EP |
|---|---|---|---|---|---|
| S12 | −1.1352E−03 | −7.5070E−04 | −2.2403E−04 | −2.2605E−05 | 1.6476E−06 |

| AAS SURFACE | FP | GP | HP | JP |
|---|---|---|---|---|
| S12 | 0.0000E+00 | 0.0000E+00 | 0.0000E+00 | 0.0000E+00 |

Figure 3A:
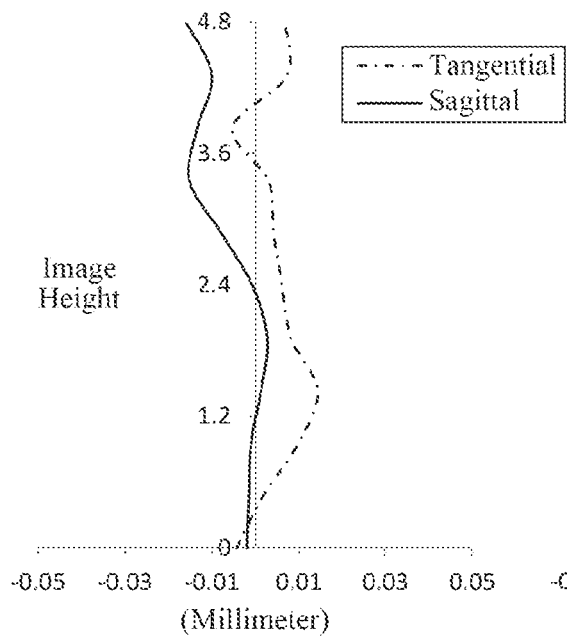
FIGS. 3A to 3C illustrate astigmatic curves of the optical imaging lens assembly in FIGS. 1A to 1C, respectively.
Figure 3B:
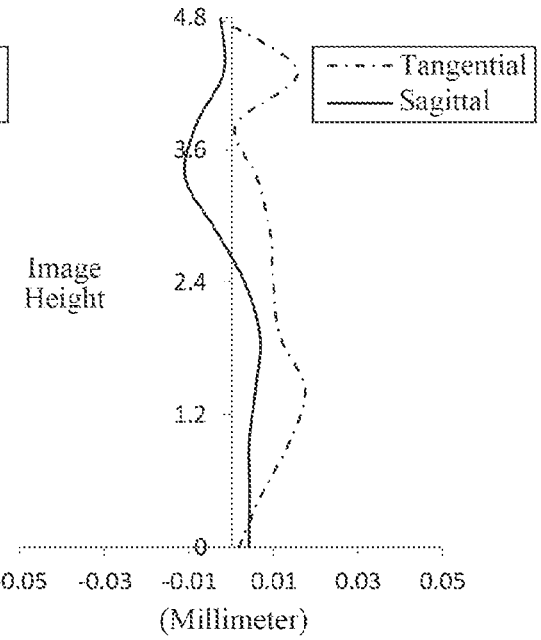
Figure 3C:
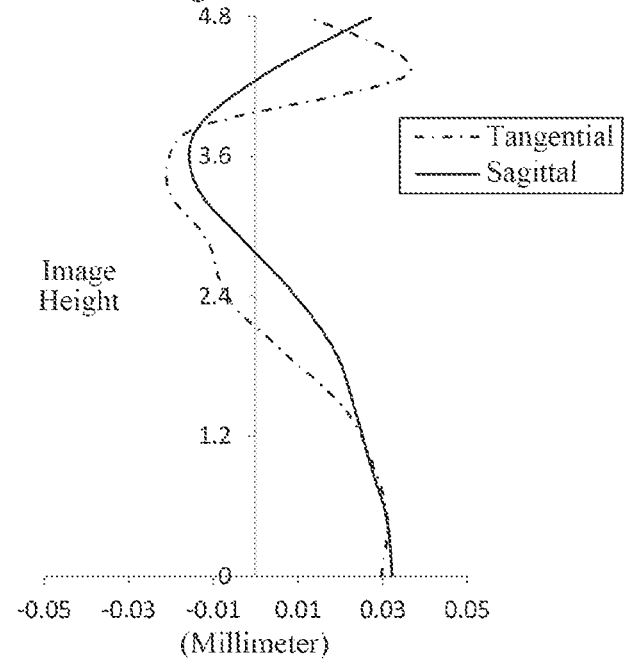
Figure 4A:
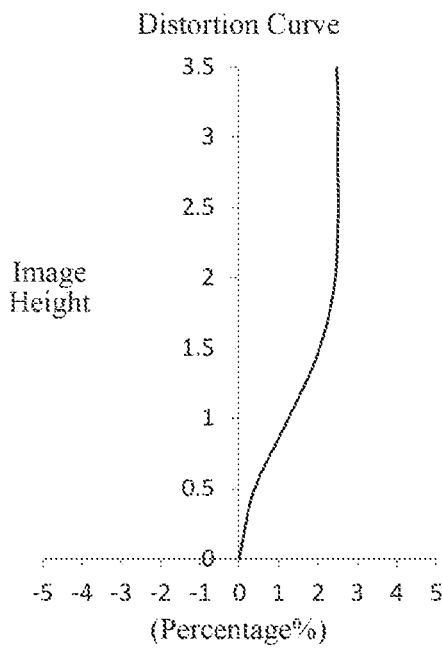
FIGS. 4A to 4C illustrate distortion curves of the optical imaging lens assembly in FIGS. 1A to 1C, respectively.
Figure 4B:
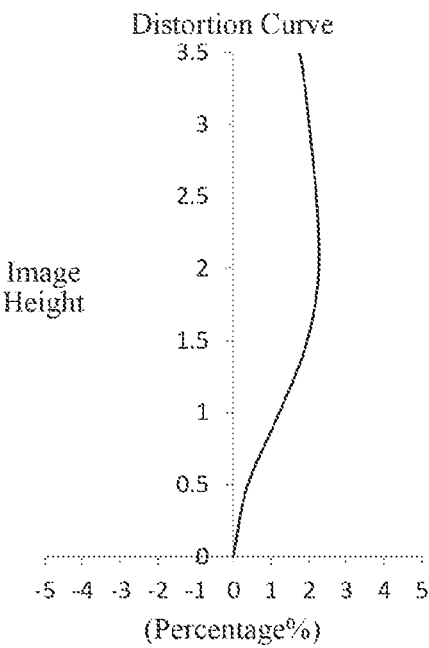
Figure 4C:
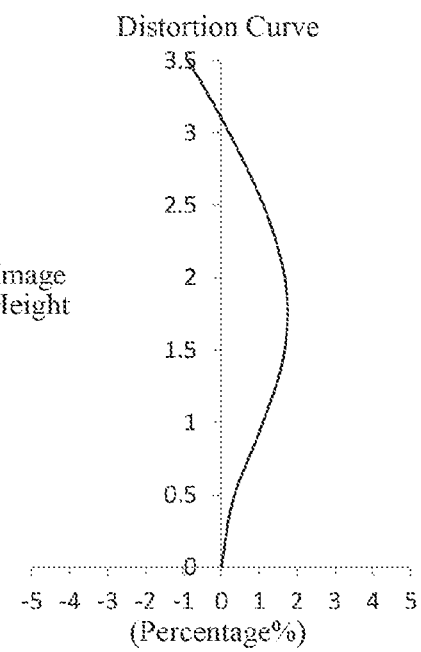
Figure 5A:
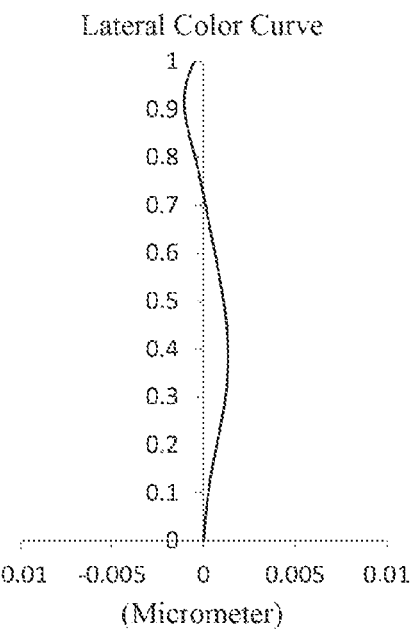
FIGS. 5A to 5C illustrate lateral color curves of the optical imaging lens assembly in FIGS. 1A to 1C, respectively.
Figure 5B:
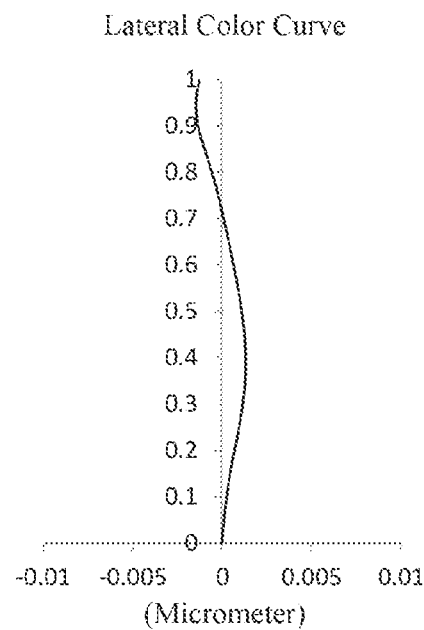
Figure 5C:
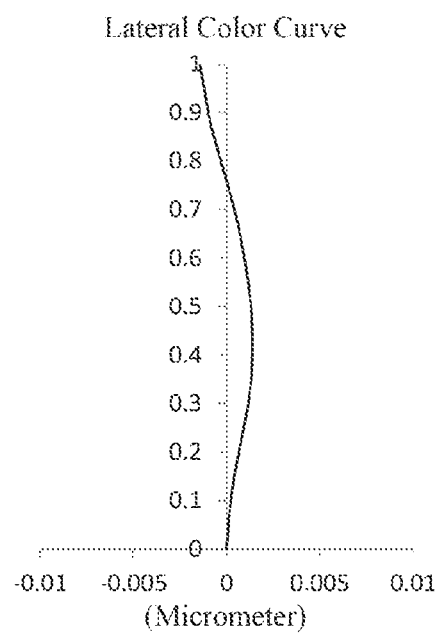

FIGS. 2A to 2C illustrate longitudinal aberration curves of the optical imaging lens assembly according to example 1 in states where the object distance is infinite, is 500 mm, and is the 100 mm, representing the deviations of focal points converged by light of different wavelengths after passing through the lens group. FIGS. 3A to 3C illustrate astigmatic curves of the optical imaging lens assembly according to example 1 in the foregoing three states, representing the curvatures of a tangential plane and the curvatures of a sagittal plane. FIGS. 4A to 4C illustrate distortion curves of the optical imaging lens assembly according to example 1 in the foregoing three states, representing amounts of distortion corresponding to different image heights. FIGS. 5A to 5C illustrate lateral color curves of the optical imaging lens assembly according to example 1 in the foregoing three states, representing deviations of different image heights on an imaging plane after light passes through the lens assembly. It can be seen from FIG. 2A to FIG. 5C that the optical imaging lens assembly provided in example 1 and the camera module equipped with the optical imaging lens assembly may achieve good image quality.

Example 2

Figure 6A:
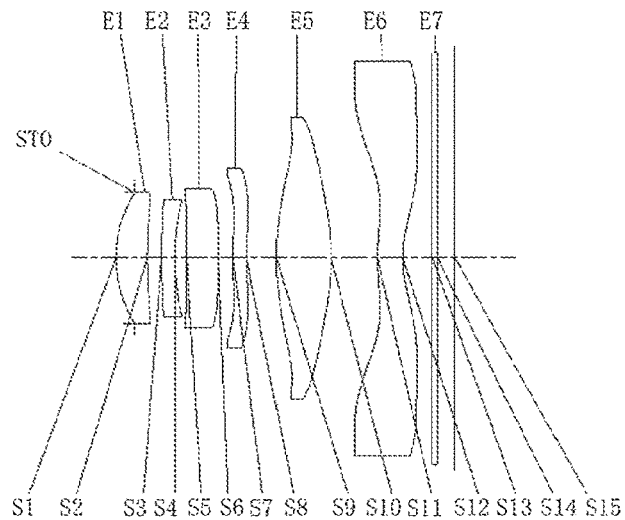
FIGS. 6A to 6C illustrate schematic structural views of an optical imaging lens assembly according to example 2 of the present disclosure in states where the object distance is infinite, the object distance is 500 mm, and the object distance is 100 mm.
Figure 6B:
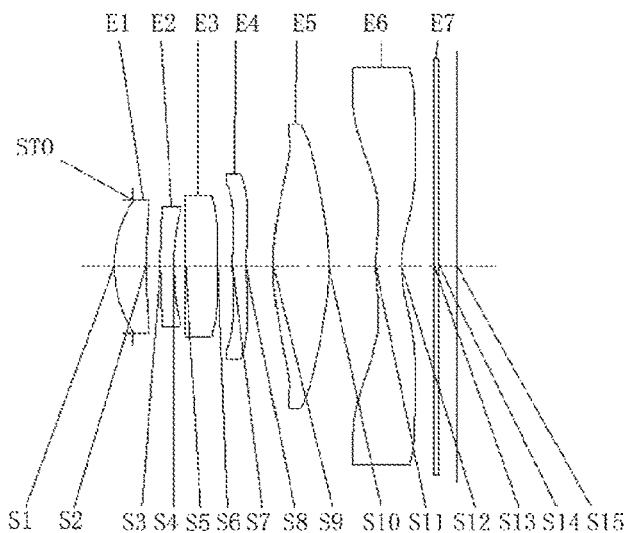
Figure 6C:
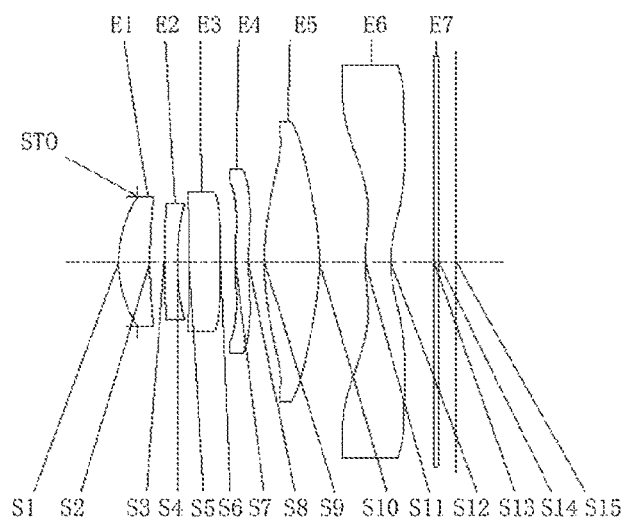

An optical imaging lens assembly according to example 2 of the present disclosure is described below with reference to FIG. 6A to FIG. 10C. In this example and the following examples, for the purpose of brevity, the description of parts similar to those in example 1 will be omitted. FIGS. 6A to 6C show schematic structural views of the optical imaging lens assembly according to example 2 of the present disclosure.

As shown in FIG. 6A to FIG. 6C, the optical imaging lens assembly includes a stop STO, a first lens E1, a second lens E2, a third lens E3, a fourth lens E4, a fifth lens E5, a sixth lens E6, a plate glass E7 and an electronic photosensitive element (not shown), which are sequentially arranged from an object side to an image side along an optical axis. The first lens E1 forms the first lens group, and the second lens E2 to the sixth lens E6 form the second lens group. In this example, the fifth lens E5 and the sixth lens E6 are configured to be movable along the optical axis. An optical filter may be disposed at an image side of the sixth lens E6.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave.

The plate glass E7 has an object-side surface S13 and an image-side surface S14. Light from an object sequentially passes through the respective surfaces S1 to S14 and is finally imaged on the electronic photosensitive element. Specifically, the plane where an effective pixel area of the electronic photosensitive element is located serves as an actual imaging plane S15 of the optical imaging lens assembly.

Table 5 is a table illustrating basic parameters of the optical imaging lens assembly of example 2, wherein the units for the radius of curvature Y, the radius of curvature X, the thickness/distance and the focal length are millimeter (mm). The value of the effective focal length f6 of the sixth lens E6 is equal to the value of the effective focal length fAy thereof in the Y-axis direction. Table 6 is a table illustrating related parameter of the optical imaging lens of example 2 in the foregoing three states, wherein the units for the TTL, f and ImgH are all millimeter (mm). Table 7 shows high-order coefficients applicable to each aspheric surface in example 2, wherein the surface shape of each aspheric surface may be defined by the formula (1) given in the above example 1.

TABLE 5

| Surface number | Surface type | Radius of curvature Y | Radius of curvature X | Thickness | Material Refractive index | Abbe number | Focal length | Conic coefficient Y | Conic coefficient X |
|---|---|---|---|---|---|---|---|---|---|
| OBJ | Spherical | Infinite | | OD | | | | | |
| STO | Spherical | Infinite | | −0.4107 | | | | | |
| S1 | Aspheric | 2.7655 | | 0.7099 | 1.55 | 56.1 | 6.65 | 0.0466 | |
| S2 | Aspheric | 10.5424 | | T1 | | | | 15.3189 | |
| S3 | Aspheric | 13.8692 | | 0.3000 | 1.68 | 19.2 | −14.44 | −94.5386 | |
| S4 | Aspheric | 5.6965 | | T2 | | | | 2.6173 | |
| S5 | Aspheric | 98.0821 | | 0.7138 | 1.57 | 37.3 | 47.53 | 50.0000 | |
| S6 | Aspheric | −37.4430 | | T3 | | | | 50.0000 | |
| S7 | Aspheric | 8.1708 | | 0.3000 | 1.62 | 25.9 | −50.22 | −26.2817 | |
| S8 | Aspheric | 6.3827 | | T4 | | | | −1.6475 | |
| S9 | Aspheric | 6.2793 | | 1.2304 | 1.55 | 56.1 | 5.97 | 0.2788 | |
| S10 | Aspheric | −6.3121 | | T5 | | | | 2.0798 | |
| S11 (AAS) | Aspheric | 4.5137 | 4.2355 | 0.5741 | 1.54 | 55.7 | −12.53 | −4.7114 | −31.7640 |
| S12 | Aspheric | 2.5819 | | T6 | | | | −4.4707 | |
| S13 | Spherical | Infinite | | 0.1100 | 1.52 | 64.2 | | | |
| S14 | Spherical | Infinite | | 0.4000 | | | | | |
| S15 | Spherical | Infinite | | | | | | | |

TABLE 6

| OD | Infinite | 500.0000 | 100.0000 |
|---|---|---|---|
| T1 | 0.3239 | ← | ← |
| T2 | 0.2646 | ← | ← |
| T3 | 0.3306 | ← | ← |
| T4 | 0.6711 | 0.6062 | 0.3612 |
| T5 | 1.0483 | ← | ← |
| T6 | 0.6663 | 0.7314 | 0.9802 |
| TTL | 7.64 | ← | 7.65 |
| FOV (°) | 82.3 | 82.9 | 84.7 |
| Fno | 1.80 | 1.82 | 1.87 |
| f | 5.34 | 5.32 | 5.24 |
| ImgH | 4.79 | ← | ← |

In this example, compared with the optical imaging lens in a state where the object distance is infinite, when the optical imaging lens assembly is in a state where the object distance is 100 mm, the fifth lens E5 and the sixth lens E6 are closer to the first lens E1, while the imaging surface S15 is farther from the first lens E1.

TABLE 7

| Surface number | A4 | A6 | A8 | A10 | A12 | A14 | A16 |
|---|---|---|---|---|---|---|---|
| S1 | −5.6565E−03 | 2.2428E−02 | −4.1538E−02 | 4.4734E−02 | −2.9361E−02 | 1.1872E−02 | −2.8821E−03 |
| S2 | 1.0694E−03 | −3.7728E−02 | 6.1671E−02 | −4.5152E−02 | 4.6238E−03 | 1.5273E−02 | −1.0595E−02 |
| S3 | −1.4403E−02 | 2.4060E−02 | −4.5000E−02 | 5.5686E−02 | −3.9984E−02 | 1.7048E−02 | −4.2869E−03 |
| S4 | −1.2984E−02 | 2.7695E−02 | −2.7088E−02 | 1.1930E−02 | 3.8152E−03 | −6.4921E−03 | 2.7955E−03 |
| S5 | 1.2550E−03 | −4.8459E−02 | 1.1738E−01 | −1.5161E−01 | 1.0983E−01 | −4.6918E−02 | 1.1754E−02 |
| S6 | −1.1553E−02 | 2.9197E−02 | −8.1889E−02 | 9.7582E−02 | −6.4211E−02 | 2.4546E−02 | −5.4174E−03 |
| S7 | −1.5625E−02 | −7.0947E−02 | 1.0802E−01 | −8.3471E−02 | 3.8636E−02 | −1.1105E−02 | 1.9366E−03 |
| S8 | −4.4544E−02 | −8.6961E−03 | 2.1755E−02 | −1.3699E−02 | 4.672 IE−03 | −9.4206E−04 | 1.1146E−04 |
| S9 | −9.2942E−03 | 5.3124E−03 | −2.5555E−03 | 6.8812E−04 | −1.1102E−04 | 1.0785E−05 | −6.1510E−07 |
| S10 | −1.7222E−03 | 5.8124E−03 | −2.1615E−03 | 4.7702E−04 | −6.6678E−05 | 5.8080E−06 | −3.0342E−07 |
| S12 | 2.7174E+00 | −3.4857E−01 | 2.2420E−01 | 3.4710E−01 | 1.0093E−01 | −9.7525E−03 | 5.4108E−02 |

| Surface number | A18 | A20 | A22 | A24 | A26 | A28 | A30 |
|---|---|---|---|---|---|---|---|
| S1 | 3.8456E−04 | −2.1671E−05 | 0.0000E+00 | 0.0000E+00 | 0.0000E+00 | 0.0000E+00 | 0.0000E+00 |
| S2 | 2.9035E−03 | −2.9697E−04 | 0.0000E+00 | 0.0000E+00 | 0.0000E+00 | 0.0000E+00 | 0.0000E+00 |
| S3 | 5.8980E−04 | −3.4420E−05 | 0.0000E+00 | 0.0000E+00 | 0.0000E+00 | 0.0000E+00 | 0.0000E+00 |
| S4 | −5.2608E−04 | 3.6567E−05 | 0.0000E+00 | 0.0000E+00 | 0.0000E+00 | 0.0000E+00 | 0.0000E+00 |
| S5 | −1.5965E−03 | 9.0703E−05 | 0.0000E+00 | 0.0000E+00 | 0.0000E+00 | 0.0000E+00 | 0.0000E+00 |
| S6 | 6.4178E−04 | −3.1648E−05 | 0.0000E+00 | 0.0000E+00 | 0.0000E+00 | 0.0000E+00 | 0.0000E+00 |
| S7 | −1.8713E−04 | 7.6599E−06 | 0.0000E+00 | 0.0000E+00 | 0.0000E+00 | 0.0000E+00 | 0.0000E+00 |
| S8 | −7.1637E−06 | 1.9181E−07 | 0.0000E+00 | 0.0000E+00 | 0.0000E+00 | 0.0000E+00 | 0.0000E+00 |
| S9 | 1.8894E−08 | −2.4518E−10 | 0.0000E+00 | 0.0000E+00 | 0.0000E+00 | 0.0000E+00 | 0.0000E+00 |
| S10 | 8.7197E−09 | −1.0454E−10 | 0.0000E+00 | 0.0000E+00 | 0.0000E+00 | 0.0000E+00 | 0.0000E+00 |
| S12 | 1.9271E−02 | −4.6615E−03 | −2.8859E−02 | 5.1999E−02 | −5.9674E−02 | 4.3744E−02 | −1.7758E−02 |

Table 8 below shows high-order coefficients of the rotationally symmetrical component and the non-rotationally symmetrical component applicable to non-rotationally symmetrical aspheric surface S11 in example 2, wherein the surface shape of the non-rotationally symmetrical aspheric surface may be defined by the formula (2) given in the above example 1.

TABLE 8

| AAS SURFACE | AR | BR | CR | DR | ER |
|---|---|---|---|---|---|
| S11 | −5.1344E−02 | 8.1728E−03 | −4.2537E−04 | −3.7922E−05 | 8.8241E−06 |

| AAS SURFACE | FR | GR | HR | JR |
|---|---|---|---|---|
| S11 | −7.4515E−07 | 3.3919E−08 | −8.1671E−10 | 8.0952E−12 |

| AAS SURFACE | AP | BP | CP | DP | EP |
|---|---|---|---|---|---|
| S11 | 2.2442E−02 | −2.0841E−03 | 4.0978E−04 | 5.4102E−05 | 0.0000E+00 |

| AAS SURFACE | FP | GP | HP | JP |
|---|---|---|---|---|
| S11 | 0.0000E+00 | 0.0000E+00 | 0.0000E+00 | 0.0000E+00 |

Figure 8A:
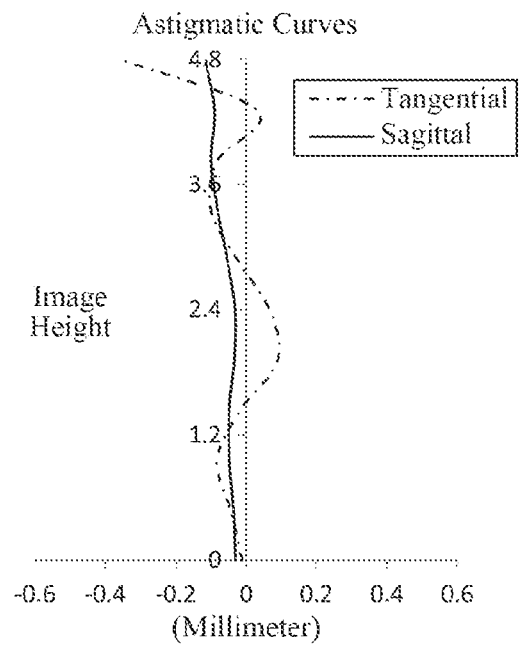
FIGS. 8A to 8C illustrate astigmatic curves of the optical imaging lens assembly in FIGS. 6A to 6C, respectively.
Figure 8B:
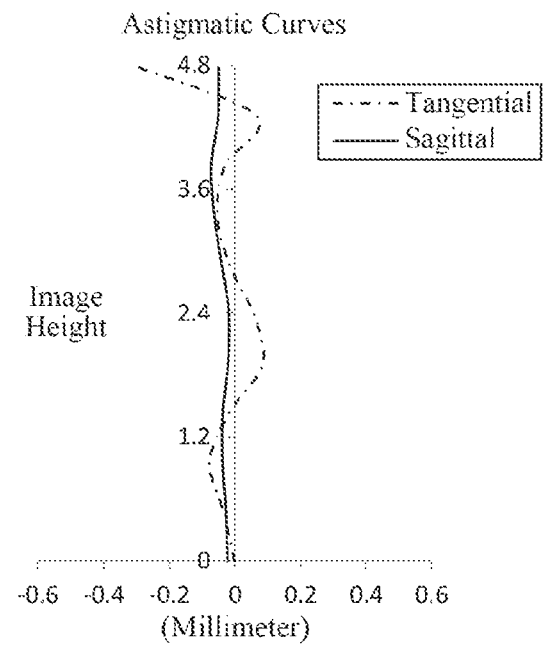
Figure 8C:
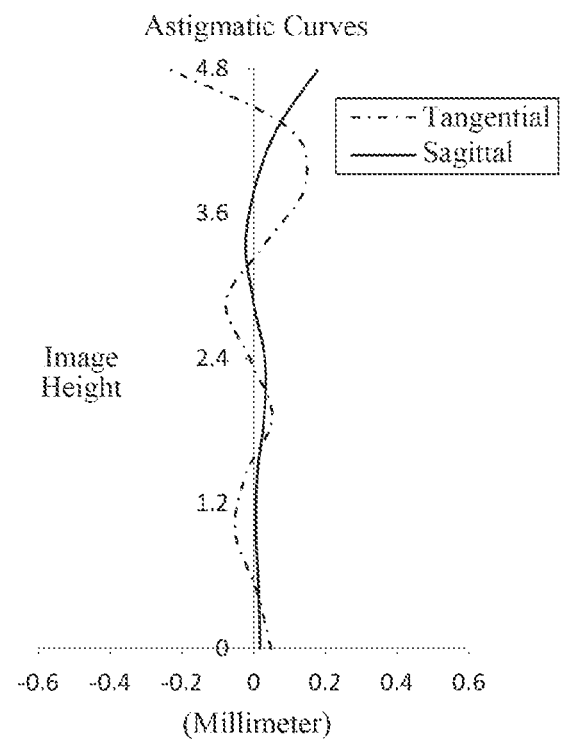
Figure 9A:
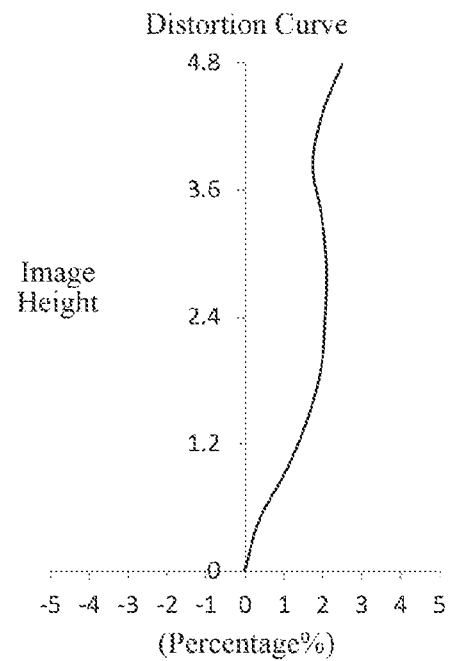
FIGS. 9A to 9C illustrate distortion curves of the optical imaging lens assembly in FIGS. 6A to 6C, respectively.
Figure 9B:
Figure 9C:
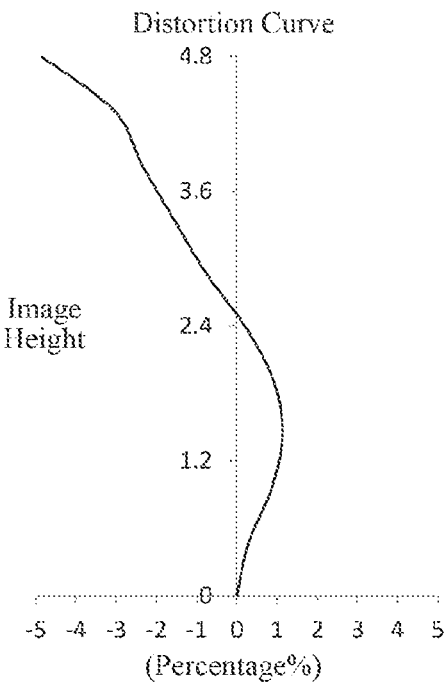
Figure 10A:
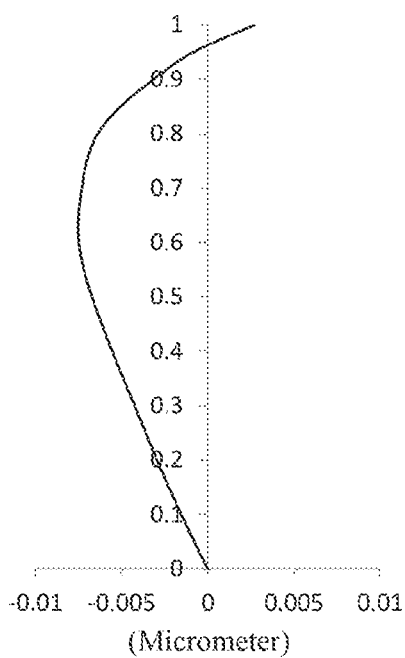
FIGS. 10A to 10C illustrate lateral color curves of the optical imaging lens assembly in FIGS. 6A to 6C, respectively.
Figure 10B:
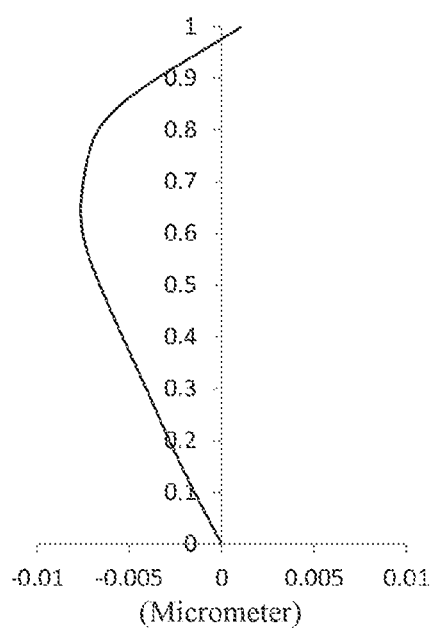
Figure 10C:
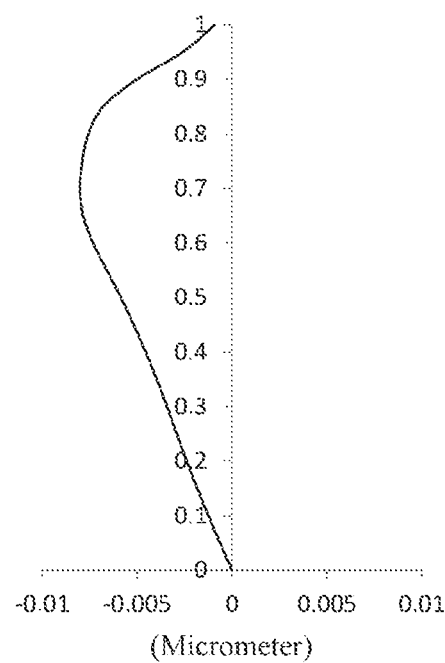

FIGS. 7A to 7C illustrate longitudinal aberration curves of the optical imaging lens assembly according to example 2 in states where the object distance is infinite, is 500 mm, and is the 100 mm, representing the deviations of focal points converged by light of different wavelengths after passing through the lens group. FIGS. 8A to 8C illustrate astigmatic curves of the optical imaging lens assembly according to example 2 in the foregoing three states, representing the curvatures of a tangential plane and the curvatures of a sagittal plane. FIGS. 9A to 9C illustrate distortion curves of the optical imaging lens assembly according to example 2 in the foregoing three states, representing amounts of distortion corresponding to different image heights. FIGS. 10A to 10C illustrate lateral color curves of the optical imaging lens assembly according to example 2 in the foregoing three states, representing deviations of different image heights on an imaging plane after light passes through the lens assembly. It can be seen from FIG. 7A to FIG. 10C that the optical imaging lens assembly provided in example 2 and the camera module equipped with the optical imaging lens assembly may achieve good image quality.

In view of the above, examples 1 to 2 respectively satisfy the relationship shown in Table 9 and Table 10.

TABLE 9

| | | Example | |
|---|---|---|---|
| Condition | | 1 | 2 |
| |Distmax| (%) | OD is Infinite | 2.50 | 2.50 |
| | OD is 500.0000 | 2.25 | 1.72 |
| | OD is 100.0000 | 2.23 | 4.3 |

TABLE 10

| | Example | |
|---|---|---|
| Condition | 1 | 2 |
| $^\Delta$CRAmax (°) | 1.08 | 1.69 |
| 10*|(fAy − fAx)/(fAy + fAx)| | 0.05 | 0.56 |

TABLE 10-continued

| Condition | Example 1 | Example 2 |
|---|---|---|
| DT51/DT32 | 1.95 | 1.91 |
| DT41/DT51 | 0.60 | 0.62 |
| ST/CT1 | −0.62 | −0.58 |
| R9/f5 | 0.89 | 1.05 |
| CT2/CT4 | 0.90 | 1.00 |
| CT1/ΣCT | 0.28 | 0.19 |
| f1/f5 | 0.94 | 1.11 |
| SAG52/DT52 | −0.11 | −0.19 |
| V3 | 37.30 | 37.30 |
| (R1 − R4)/(R1 + R4) | −0.39 | −0.35 |

The present disclosure further provides a camera module, which may be an independent imaging device such as a digital camera, or may be a module integrated in a mobile electronic device such as a mobile phone. The camera module is equipped with the optical imaging lens assembly described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens group having positive refractive power and including a first lens with refractive power;
   a second lens group, sequentially from the object side to the image side along the optical axis, including a second lens, a third lens, a fourth lens, a fifth lens and a sixth lens, each of the second to the sixth lenses having refractive power;
   a plate glass; and
   a photosensitive element,
   wherein |Distmax|<5%, where Distmax is a maximum optical distortion of the optical imaging lens assembly
   at least one of the object-side surface and the image-side surface of the sixth lens is a non-rotationally symmetric surface; and
   at least one of the first lens to the sixth lens is configured to be movable relative to the photosensitive element in a direction of the optical axis; and
   wherein $0 < 10*|(fAy-fAx)/(fAy+fAx)| < 10$,
   where fAy is an effective focal length of the sixth lens in a Y-axis direction, and
   fAx is an effective focal length of the sixth lens in an X-axis direction.

2. The optical imaging lens assembly according to claim 1, wherein ΔCRAmax<2°,
   where ΔCRAmax is a maximum amount of change of a chief ray angle of the optical imaging lens assembly.

3. The optical imaging lens assembly according to claim 1, wherein effective half-apertures of the second to the sixth lenses increase sequentially; and
   1.5<DT51/DT32<2.5,
   where DT51 is a maximum effective half-aperture of an object-side surface of the fifth lens, and DT32 is a maximum effective half-aperture of an image-side surface of the third lens.

4. The optical imaging lens assembly according to claim 1, wherein 0.5<DT41/DT51<1,
   where DT41 is a maximum effective half-aperture of an object-side surface of the fourth lens, and DT51 is a maximum effective half-aperture of an object-side surface of the fifth lens.

5. The optical imaging lens assembly according to claim 1, further comprising a stop disposed at an object side of the first lens;
   wherein −1<ST/CT1<0, where ST is a distance from the stop to an object-side surface of the first lens along the optical axis, and CT1 is a center thickness of the first lens along the optical axis.

6. The optical imaging lens assembly according to claim 1, wherein the fifth lens has positive refractive power; and 0.5<R9/f5<1.5,
   where R9 is a radius of curvature of an object-side surface of the fifth lens, and f5 is an effective focal length of the fifth lens.

7. The optical imaging lens assembly according to claim 1, wherein 0.8<CT2/CT4<1.2,
   where CT2 is a center thickness of the second lens along the optical axis, and CT4 is a center thickness of the fourth lens along the optical axis.

8. The optical imaging lens assembly according to claim 1, wherein 0.1<CT1/ΣCT<0.5,
   where CT1 is a center thickness of the first lens along the optical axis, and ΣCT is a sum of center thicknesses along the optical axis of lenses in the first lens group and the second lens group.

9. The optical imaging lens assembly according to claim 1, wherein 0.7<f1/f5<1.3,
   where f1 is an effective focal length of the first lens, and f5 is an effective focal length of the fifth lens.

10. The optical imaging lens assembly according to claim 1, wherein −0.3<SAG52/DT52<0,
    where SAG52 is an on-axis distance from an intersection of an image-side surface of the fifth lens and the optical axis to a vertex of an effective radius of the image-side surface of the fifth lens, and DT52 is a maximum effective half-aperture of the image-side surface of the fifth lens.

11. The optical imaging lens assembly according to claim 1, wherein 30<V3<50,
    where V3 is an Abbe number of the third lens.

12. The optical imaging lens assembly according to claim 1, wherein −0.5<(R1−R4)/(R1+R4)<0,
    where R1 is a radius of curvature of an object-side surface of the first lens, and R4 is a radius of curvature of an image-side surface of the second lens.

* * * * *